United States Patent

Ungruh et al.

[11] Patent Number: 6,097,795
[45] Date of Patent: Aug. 1, 2000

[54] METHOD FOR NOTIFICATION AND CONTROL OF INCOMING CALLS IN A NETWORK

[75] Inventors: Joachim Ungruh; Silvia Krob; Hendrik Kurzawa, all of München; Christian Schmidt, Augsburg; Thomas Lange, Landshut; Andreas Lindenthal, München, all of Germany

[73] Assignee: Siemens Aktiengesellschaft, Munich, Germany

[21] Appl. No.: 09/202,991

[22] PCT Filed: May 8, 1998

[86] PCT No.: PCT/EP98/02702

§ 371 Date: Dec. 23, 1998

§ 102(e) Date: Dec. 23, 1998

[87] PCT Pub. No.: WO98/52339

PCT Pub. Date: Nov. 19, 1998

[30] Foreign Application Priority Data

May 9, 1997 [DE] Germany ............................ 97 107 650

[51] Int. Cl.[7] .................................................. H04M 11/00

[52] U.S. Cl. ...................................... 379/93.35; 379/93.23; 379/215

[58] Field of Search .............................. 379/93.17, 93.23, 379/93.35, 90.01, 215–217

[56] References Cited

U.S. PATENT DOCUMENTS

| | | | |
|---|---|---|---|
| 4,995,074 | 2/1991 | Goldman et al. | |
| 5,805,587 | 9/1998 | Norris et al. | 379/93.35 |
| 5,809,128 | 9/1998 | McMullin | 379/93.35 |
| 5,982,774 | 11/1999 | Foladare et al. | 379/215 |

FOREIGN PATENT DOCUMENTS

| | | |
|---|---|---|
| 33 15 884 A1 | 11/1984 | Germany . |
| WO 97/20424 | 6/1997 | WIPO . |
| WO 97/26749 | 7/1997 | WIPO . |

*Primary Examiner*—Wing F. Chan
*Attorney, Agent, or Firm*—Hill & Simpson

[57] ABSTRACT

When an analog telephone subscriber is in an Internet session via a modem connection, he cannot be reached by telephone. The invention enables a message about a telephone service incoming during the Internet session.

3 Claims, 1 Drawing Sheet

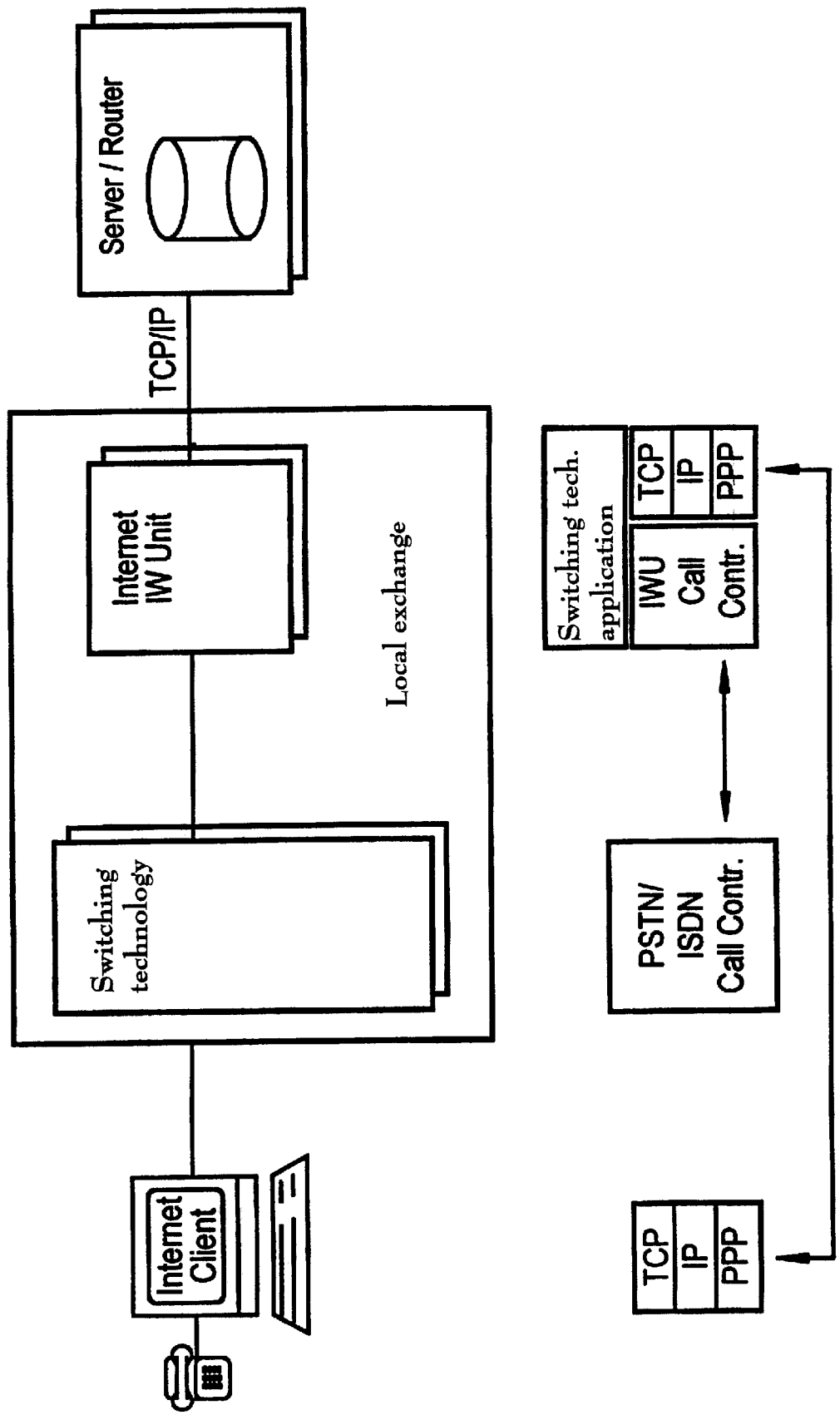

METHOD FOR NOTIFICATION AND CONTROL OF INCOMING CALLS IN A NETWORK

BACKGROUND OF THE INVENTION

When an analog telephone subscriber is in an Internet session via a modem connection, he cannot be reached by telephone since he does not have a second message channel. There is no possibility in traditional technology of informing the subscriber about an incoming call since no information to the subscriber can be transmitted into the existing modem connection.

As a result of this situation, connection attempts of third parties to said Internet subscriber are lost. The Internet subscriber continues to receive no information whatsoever about incoming call attempts of third parties during the time of his Internet session.

SUMMARY OF THE INVENTION

The invention is based on the problem of specifying a method with which said problems are overcome.

The invention enables a communication between the local telephone exchange of the Internet subscriber and the Internet subscriber over the Internet session. With the assistance of this communication, information (such as, for example, about incoming calls and telephone numbers of the callers) can be transmitted to a subscriber via his message channel over which he is simultaneously in an Internet session.

The invention is particularly advantageous for an analog subscriber since this subscriber has only a single message channel available, i.e. no second message channel and no D-channel, either.

According to one embodiment of the invention, it is possible for a subscriber to transmit the decision of whether he wishes to accept an incoming call to the local exchange so that it delivers this call as warranted.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE depicts the method of the present invention.

DESCRIPTION OF THE PREFERRED EMBODIMENTS

The FIGURE shows the fundamental technique of the invention. What is referred to as an Internet interworking unit IWU is integrated in the local exchange, this realizing the point of presence POP into the Internet and concluding the modem protocols of the analog subscribers (modem pool is integrated in the IWU). The IWU is usually connected to the switching technology (such as a private branch exchange) via an ISDN primary multiplex connection (ISDN primary rate interface, ISDN-PRI). Messages between IWU and switching technology are exchanged via the D-channel.

In order to enable the communication, the IWU—after the subscriber logs on—sends the dynamic IP address to the switching technology, where it is stored for further action. When a message is to be sent from the 'switching technology' to an Internet subscriber (for example, for information about incoming calls), then this information is forwarded from the 'switching technology' to the Internet IWU (D-channel message). The message contains the dynamic IP address of the affected subscriber. In the IWU, the message is converted into an IP-packet and sent to the subscriber (TCP/IP/PPP or UDP/IP/PPP). In reverse direction, the subscriber sends an IP-packet with a specific application number to the IWU. The specific application converts the IP-packet into a message that, for example, is forwarded via the D-channel to the switching technology.

When the IWU is not in the local exchange of the Internet subscriber but in some other switching center, then the messages between the switching centers are exchanged via the protocols SCCP and/or TCAP. The path selection is made on the basis of the E.164 number of the subscriber and the E.164 number of the IWU.

Subscriber performance features such as, for example, 'call waiting at Internet subscribers' can be realized with this communication possibility.

Given an incoming call, the subscriber connected to the Internet point of presence can be provided with information about this call. The subscriber forwards his wishes to accept or not accept the call to the switching center, which subsequently delivers or rejects the incoming call.

The invention enables the transmission of a message to an Internet subscriber from the local exchange over the existing message channel. To that end, a message in the local exchange is sent to the Internet point of presence, is converted into an IP-packet there at and is sent to the subscriber himself via the connection of the subscriber to the Internet. The information path from the subscriber to the local exchange ensues with the same mechanism. The subscriber sends an IP-packet to the point of presence, this converts the IP-packet into a message that is sent to the appertaining local exchange.

What is important in this mechanism is that the appertaining local exchange of the subscriber is provided with the knowledge by the point of presence that the subscriber is in an internet session, and what dynamically allocated in address the subscriber has in this session.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for notification and control of incoming calls in a network, comprising the steps of:

setting up a message channel connection to a POP of the Internet for a subscriber via a network access node of the subscriber by providing from the POP to the network access node a dynamic IP address of the subscriber;

forwarding, given a service, such as a call, incoming for the subscriber at the network access node via a telephone network during existence of the POP connection, by a local exchange message about this event to the POP, the message comprising said IP address; and forwarding the message by the POP to the subscriber via the message channel connection.

2. The method according to claim 1, wherein a decision as to whether the subscriber wishes to accept an incoming call or not is transmitted from the POP to the local exchange.

3. The method according to claim 2, wherein, given acceptance of the call, the existing connection between subscriber and POP is cleared down and the call is delivered to the subscriber via the local exchange.

* * * * *